March 18, 1952     E. C. CHATFIELD     2,589,774
BULB SETTER
Filed Jan. 23, 1948
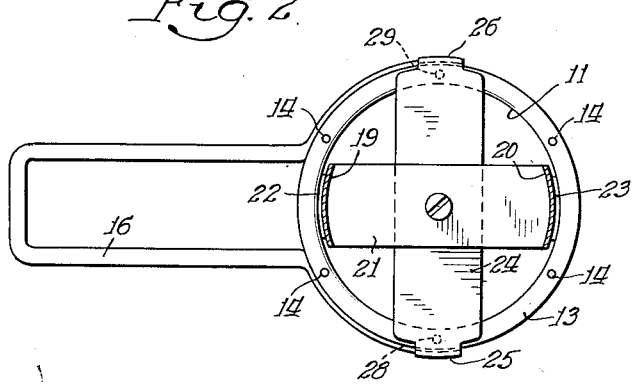
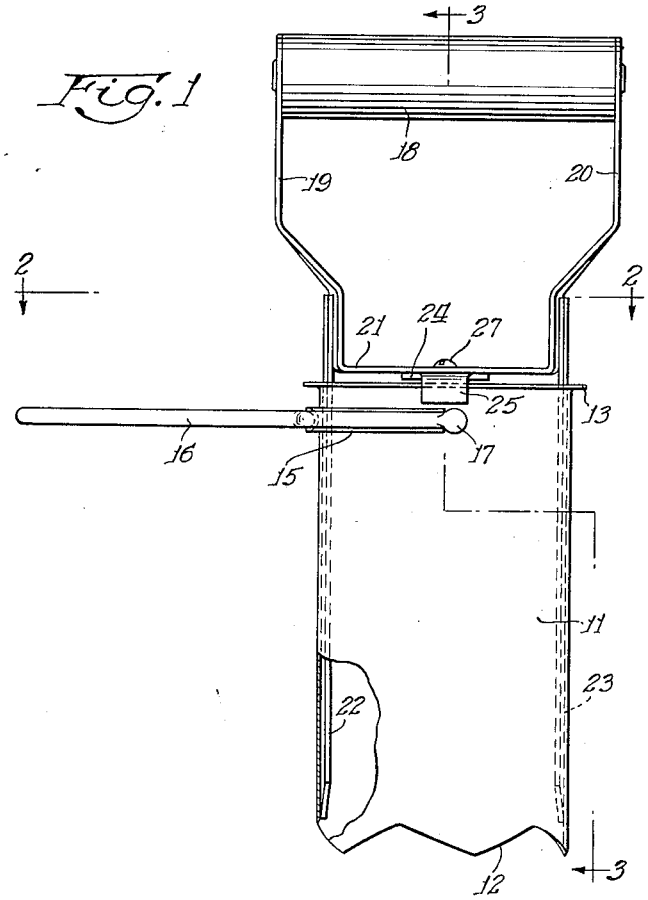
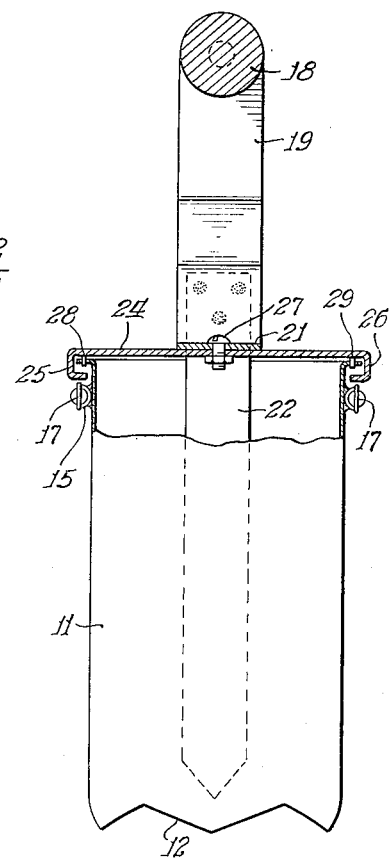
Inventor:
Earl C. Chatfield
By: Alois W. Graf
Atty.

Patented Mar. 18, 1952

2,589,774

UNITED STATES PATENT OFFICE 2,589,774

BULB SETTER

Earl C. Chatfield, Oak Park, Ill.

Application January 23, 1948, Serial No. 4,017

6 Claims. (Cl. 294—50.7)

The present invention relates to a bulb setter particularly suited for planting tulips, gladioli, and other similar types of bulbs.

One of the most frequent causes of disappointment for the amateur gardener is the failure of his bulb plants to produce satisfactory flowers. One of the principal causes of this failure is the inaccuracy with which such bulbs are planted in spite of adequate instructions readily obtainable in all garden books and magazines, and the instructions which are furnished by seed houses to the purchaser of the bulbs. Bulbs that are planted too deep or too shallow do not produce as good flowers as bulbs which are planted at the proper depth. To facilitate planting at the proper depth it is proposed to provide a bulb setter of simple construction and operation by means of which the proper amount of soil may be removed for planting at the proper depth.

It is, therefore, an object of the present invention to provide an improved bulb setter.

A further object of the present invention is to provide an improved bulb setter which is simple to operate and which is economical to manufacture.

Other and further objects of the present invention subsequently will become apparent by reference to the following description taken in conjunction with the accompanying drawings wherein:

Figure 1 is a side view of a bulb setter constructed in accordance with the present invention;

Figure 2 is a top view as seen in the direction of the arrows along the line 2—2 of Figure 1; and Figure 3 is a view partially in cross-section as seen in the direction of the arrows along the stepped line 3—3 of Figure 1.

Referring to the drawings it will be seen that the bulb setter constructed in accordance with the present invention has a tubular body and cupping member 11 which at its lower extremity is provided with a serrated or scalloped cutting edge 12. The upper end of the tubular member 11 is provided with a horizontal flange 13 having therein a plurality of apertures 14. Near the top a cylindrical member 11 is provided with a semicircular channel 15 for receiving the arcuate extremity of a handle 16 which is formed of wire or light rod material. Preferably, the arcuate extremities of the handle 16 are provided with upstruck or flattened enlargements 17 for securely locking the handle in the channel 15. This manner of constructing the handle and supporting it on the tubular portion 11 is provided so that the handle 16 may be removed during the shipment of the bulb setter.

The cylindrical body member 11 is preferably formed so as to have a diameter sufficient to make an opening large enough for the largest type of bulbs to be planted. On the exterior of the body member 11 suitable indicia may be provided to indicate the depth to which the device is to be inserted for planting different size and types of bulbs. These indicia, therefore, serve as guides for the planting of such smaller types of bulbs as tulips and narcissus.

Extending upwardly above the cylindrical body member 11 is a transversely arranged handle 18 supported between two legs 19 and 20 of a U-shaped member 21.

The lower portion of the U-shaped member 22 has secured thereto two scraping or cleaning members 22 and 23 which extend downwardly within the cylindrical body member 11 to substantially the lower serrated edge 12. Located at substantially right angles to the U-shaped member 21 there is a transversely arranged support strap 24 having end portions 25 and 26 which extend over the flange 13 of the cylindrical body member 11. The strap 24 is connected to the U-shaped member 21 by means of a suitable bolt 27 or rivet. The member 24 adjacent the extremities is provided with downwardly extending projections 28 and 29 which are located so as to engage the apertures 14 in the flange 13 of the cylindrical body member 11. It will be noted from Figure 3 that if an upward force is made on the handle 18, that the projections 28 and 29 may be withdrawn from the apertures 14. By holding the device securely with one hand by grasping the handle 16 it is now possible to rotate the handle 18, thereby to cause the blades 22 to scrape or clean the inside surface of the cylindrical body member 11.

It now may be assumed that it is desired to use the device to form holes for the planting of bulbs. Selection of the proper indicia on the side of the cylindrical body member 11 is first made in accordance with the type of bulb to be planted. Thereupon the device is set in approximately the position where the hole is to be made. The handle 18 is grasped and rotated until the projections 28 and 29 engage the apertures 14 and the rim 13. A downward pressure is now applied to the handle 18 to force the cylindrical body portion 11 to the proper depth in the earth. Upon reaching the proper depth the handle 18 is again rotated so as to free the outer surface of the cylindrical member 11 from the remaining soil. Obviously, of course, a twisted motion may also be employed in pressing the cylindrical member down into the soil to the proper depth. Having reached the proper depth the handle 18 is then raised to withdraw from the ground the soil now contained within the inner surfaces of the cylindrical member 11. In order to clean out the soil thus removed, the handle 16 is held rigidly and the handle 18 is rotated so as to cause the scraping and cleaning members 22 and 23 to loosen the soil within the cylindrical member 11 so that it drops. The bulb setter is then ready for use to cut or form another bulb setting hole.

While for the purpose of illustrating and describing the present invention, a preferred embodiment has been illustrated in the drawings, it is to be understood that the invention is not to be limited thereby since such variations in the components employed and their arrangement are contemplated as may be commensurate with the spirit and scope of the invention set forth in the accompanying claims.

What I desire to protect by United States Letters Patent is claimed as follows:

1. A gardener's implement comprising a tubular body member having at one end a flange, and at the opposite end a cutting edge, a pair of scraping blades positioned adjacent to the inner surface of said body member for rotary movement therein, a handle secured to said blades, and a member carried by said handle for latching said handle to the flange of said body member, when said handle is moved axially towards said flange, said handle being arranged to be rotated when moved away from said flange, thereby to actuate said blades.

2. A gardener's implement comprising a tubular body member having at one end a cutting edge, and at the opposite edge a flange, a pair of scraping blades positioned adjacent the inner surface of said body member, a handle secured to said blades for rotating said blades relative to said body member, and a latching member carried by said handle for latching said handle to said flange of said body when said handle is moved axially towards said flange, said flange being provided with means for cooperating with said latching member whereby said handle is held against rotational movement relative to said body member.

3. A gardener's implement for forming in the soil holes of desired depth for planting bulbs therein comprising a tubular body member having a flange, a laterally extending handle mounted on said body member adjacent said flange, a pair of scraping blades positioned adjacent the inner surface of said body member for rotary movement therein, a second handle secured to said blades, and a latching member carried by said second handle for latching said handle and said blade in fixed relaiton to said body when axial force is applied to said handle in a direction toward said flange, said latching member being mounted to engage said flange.

4. An implement for forming in the soil holes of desired depth for planting bulbs comprising a tubular body member having at one end a cutting edge and at the other end a rim, a pair of scraping blades mounted adjacent the inner surface of said body member for rotation relative thereto, a handle secured to said blades, said handle being positioned above said body and extending in a diametrical direction, a latching member carried by said handle to latch said handle against rotation relative to said body member, said latching member extending over said rim to limit the axial movement of said handle relative to said body in latched and unlatched positions, and means formed in said rim for cooperation with said latching member.

5. An implement for forming holes in the soil to the desired depth for planting bulbs comprising a tubular body member having at one end a sawtooth cutting edge and at the other end a rim, said rim having therein a plurality of perforations, a pair of longitudinally extending scraping blades mounted adjacent the inner surface of said body member for rotation relative thereto, a handle secured to said blades, said handle being positioned above said body and extending in a diametrical direction, and a latching member carried by said handle and having projections to engage the perforations of said rim to latch said handle against rotation when said handle is moved downwardly.

6. An implement for forming holes of desired depth in the soil for planting bulbs comprising a tubular body member having at one end a cutting edge and at the other end a rim, said rim having a plurality of perforations therein, a pair of longitudinally extending scraping blades mounted adjacent the inner surface of said body member for rotation relative thereto, a handle secured to said blades, said handle being positioned upon said body and extending in a diametrical direction, a latching member carried by said handle and having projections to engage the perforations of said rim when said handle is moved toward said rim, and a second handle mounted to extend radially outward from said body member in the proximity of said rim.

EARL C. CHATFIELD.

REFERENCES CITED

The following references are of record in the file of this patent:

UNITED STATES PATENTS

| Number | Name | Date |
| --- | --- | --- |
| 750,888 | Pine | Feb. 2, 1904 |